United States Patent [19]
Kim

[11] Patent Number: 5,982,396
[45] Date of Patent: Nov. 9, 1999

[54] MEMORY ADDRESSING APPARATUS FOR BLOCK SCAN AND RASTER SCAN AND A MEMORY ADDRESSING METHOD USING THE SAME

[75] Inventor: Kyoung-ho Kim, Kunpo, Rep. of Korea

[73] Assignee: SamSung Electronics Co., Ltd, Suwon, Rep. of Korea

[21] Appl. No.: 08/982,259

[22] Filed: Dec. 1, 1997

[30] Foreign Application Priority Data

Dec. 4, 1996 [KR] Rep. of Korea ........................ 96/61663

[51] Int. Cl.⁶ ...................................................... G06F 12/06
[52] U.S. Cl. ............................................ 345/516; 348/718
[58] Field of Search .................................... 345/501–504, 345/507, 509, 515, 516, 202, 203; 348/714, 715, 718, 719, 720

[56] References Cited

U.S. PATENT DOCUMENTS

| | | | |
|---|---|---|---|
| 5,343,243 | 8/1994 | Maeda | 348/222 |
| 5,428,395 | 6/1995 | Jeong | 345/412 |
| 5,455,908 | 10/1995 | Ishida | 345/516 |
| 5,517,666 | 5/1996 | Ohtani et al. | 395/800.3 |
| 5,563,662 | 10/1996 | Kishi | 348/420 |

*Primary Examiner*—U. Chauhan
*Attorney, Agent, or Firm*—Robert E. Bushell, Esq.

[57] ABSTRACT

Memory addressing apparatus and method for block scan and raster scan in an apparatus for processing image data of which the horizontal resolution is H and the vertical resolution is V. The memory addressing apparatus includes a horizontal counter for outputting a value sequentially incremented by a write or read signal for storing or reading image data in or from the memory, a vertical counter for outputting a value sequentially incremented by a horizontal synchronizing signal included in the image data, and an address generator for generating an address for raster scan or block scan according to a control signal by the horizontal and the vertical count values. Accordingly, memory address generating functions for raster scan and block scan are integrated into one unit, thereby the amount of required hardware is reduced, and simple design and structure of the apparatus reduce manufacturing cost.

12 Claims, 7 Drawing Sheets

FIG. 3

| COLUMN / RASTER LINE | 1 | 2 | 3 | 4 | 4 | 6 | 7 | 8 | 9 | 10 | ... | 32 |
|---|---|---|---|---|---|---|---|---|---|---|---|---|
| 0 | 0 | 1 | 2 | 3 | 4 | 5 | 6 | 7 | 8 | 9 | ... | 31 |
| 1 | 32 | 33 | 34 | 35 | 36 | 37 | 38 | 39 | 40 | 41 | ... | 63 |
| 2 | 64 | 65 | 66 | 67 | 68 | 69 | 70 | 71 | 72 | 73 | ... | 95 |
| 3 | 96 | 97 | 98 | 99 | 100 | 101 | 102 | 103 | 104 | 105 | ... | 127 |
| 4 | 128 | 129 | 130 | 131 | 132 | 133 | 134 | 135 | 136 | 137 | ... | 159 |
| 5 | 160 | 161 | 162 | 163 | 164 | 165 | 166 | 167 | 168 | 169 | ... | 191 |
| 6 | 192 | 193 | 194 | 195 | 196 | 197 | 198 | 199 | 200 | 201 | ... | 223 |
| 7 | 224 | 225 | 226 | 227 | 228 | 229 | 230 | 231 | 232 | 233 | ... | 225 |
| ... | ... | ... | ... | ... | ... | ... | ... | ... | ... | ... | . | ... |
| 23 | 736 | 737 | 738 | 739 | 740 | 741 | 742 | 743 | 744 | 745 | ... | 767 |

| MEMORY ADDRESS / SCAN SEQUENCE | A 0 | A 1 | A 2 | A 3 | A 4 | A 5 | A 6 | A 7 | A 8 | A 9 | A 10 | A 11 | A 12 | A 13 | A 14 | A 15 | A 16 | A 17 | A 18 |
|---|---|---|---|---|---|---|---|---|---|---|---|---|---|---|---|---|---|---|---|
| RASTER SCAN | N 0 | N 1 | N 2 | N 3 | N 4 | N 5 | N 6 | N 7 | N 8 | N 9 | M 0 | M 1 | M 2 | M 3 | M 4 | M 5 | M 6 | M 7 | M 8 |
| BLOCK SCAN | N 0 | N 1 | N 2 | N 6 | N 7 | N 8 | N 9 | M 0 | M 1 | M 2 | N 3 | N 4 | N 5 | M 3 | M 4 | M 5 | M 6 | M 7 | M 8 |

FIG. 7

MEMORY ADDRESSING APPARATUS FOR BLOCK SCAN AND RASTER SCAN AND A MEMORY ADDRESSING METHOD USING THE SAME

CLAIM OF PRIORITY

This application makes reference to, incorporates the same herein, and claims all benefits accruing under 35 U.S.C §119 from an application entitled *Memory Addressing Apparatus For Block Scan And Raster Scan And Memory Addressing Method Using The Same* earlier filed in the Korean Industrial Property Office on Dec. 4, 1996, and there duly assigned Ser. No. 96-61663 by that Office.

BACKGROUND OF THE INVENTION

1. Field of the Invention

The present invention relates to an apparatus for addressing a memory for temporarily storing image data or reading image data stored in a memory according to a JPEG (Joint Photographic Experts Group) or MPEG (Moving Picture Experts Group) signal compression and expansion process, and a method thereof, and more particularly, to an addressing apparatus in which a discrete cosine transform (DCT) block scan address generation function and a raster scan address generation function are integrated, and an addressing method therefor.

2. Background Art

In an exemplary image data compressor external image signals are converted to composite data by analog-to-digital converion, and the composite data is divided into luminance and chrominance components which are then divided into Y, Cr and Cb data. The Y, Cr and Cb data is stored in a memory according to a sequence of conversion where a memory address line is connected to the output of a raster scan address generator. At this time, a horizontal synchronizing signal controls the change from one raster line to the next raster line, and a vertical synchronizing signal indicates the ending of a field or a frame. When an image data compressor performs the DCT with respect to the data stored in the memory, the data stored in the memory is read in a sequence of 8×8 blocks (or 4×4 blocks), where the memory address line is connected to the output of a separate block scan address generator. An exemplary image data decoder decodes the compressed data in a sequence reverse to that of the compressing process. That is, memory address lines are connected to the output of a block scan address generator for an image data decoder to decode the compressed data, and the memory address lines are connected to the output of a separate raster scan address generator for a luminance/ chrominance combiner to combine the luminance and chrominance data into composite data. The combined data is then converted to an image signal using digital-to-analog conversion. Accordingly, two address generators are required according to the above-described sequences of raster scan and block scan, to thereby require a great deal of hard wares, which complicates the design of the hardware, and thus increases the total cost.

Another example of image signal compression and expansion using DCT is contemplated by Kenji Kishi in U.S. Pat. No. 5,563,662 entitled *Image Signal Compressing and Expansion With Filter Means To Eliminate Blocking Effect* wherein resulting DCT coefficients are subjected to quantization and Hoffman coding prior to storage in a memory as compressed image data and decoded in reverse using Hoffman decoding and inverse quantization to generate decoded DCT coefficients which are input to an inverse discrete cosine transform circuit to be converted to an image signal which is then filtered and differentiated to remove deformation caused by boundaries between blocks.

SUMMARY OF THE INVENTION

To solve the above problems, it is an object of the present invention to provide a memory addressing apparatus having one address generator combining the function of a raster scan address generator with that of a block scan address generator by considering regularity in an address generating process in the case of an image processing and decoding system where DCT block size is fixed, and a memory addressing method using the same.

To accomplish the above object of the present invention, there is provided an apparatus for generating a memory address for storing image data in a memory or for reading the image data stored in the memory in an apparatus for processing image data of which the horizontal resolution is H and the vertical resolution is V, the memory addressing apparatus comprising: a horizontal counter including N bit outputs, where 'N' is the smallest integer satisfying $H \leq 2^N$, which outputs a value sequentially incremented by a write or read signal for storing or reading image data in or from the memory; a vertical counter including M bit outputs, where M is the smallest integer satisfying $V \leq 2^M$, which outputs a value sequentially incremented by a horizontal synchronizing signal included in the image data; and an address exchanger for generating an address by the horizontal count value and the vertical count value for raster scan or block scan according to a control signal.

Also, to accomplish the above object, there is a method for generating a memory address for storing image data in a memory or for reading the image data stored in the memory in an apparatus for processing image data of which the horizontal resolution is H and the vertical resolution is V, the memory addressing method comprising: a first step of generating a N bit horizontal count value, where 'N' is the smallest integer satisfying $H \leq 2^N$, sequentially incremented by a write or read signal for storing or reading image data in or from the memory; a second step of generating a M bit vertical count value, where M is the smallest integer satisfying $V \leq 2^M$, sequentially incremented by a horizontal synchronizing signal which is included in the image data; and a third step of combining the horizontal count value and the vertical count value, thereby generating a memory address for raster scan or block scan according to a control signal.

BRIEF DESCRIPTION OF THE DRAWINGS

The above objects and advantages of the present invention will become more apparent by describing in detail a preferred embodiment thereof with reference to the attached drawings in which:

FIG. 3 shows a sequence of storing image data in a memory after A/D conversion;

FIG. 7 shows connections between memory address lines and the output of a horizontal counter and a vertical counter of FIG. 6.

DETAILED DESCRIPTION OF THE INVENTION

Figure 1:
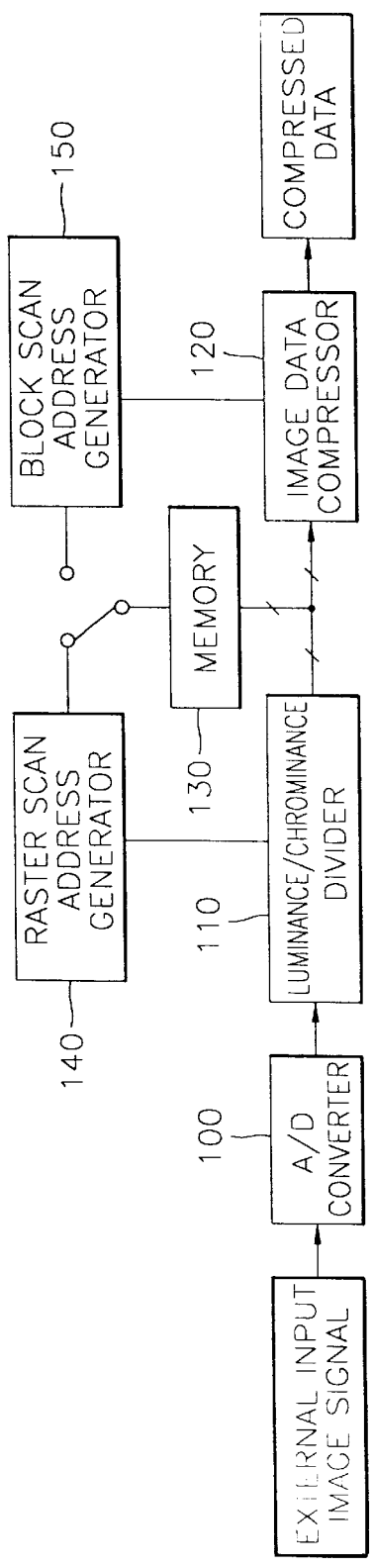
FIG. 1 is a block diagram of a conventional image compressor.

FIG. 1 is a block diagram of an exemplary image data compressor. External image signals are converted to composite data by an A/D converter 100. The composite data is divided into luminance and chrominance components, and then converted to Y, Cr and Cb data in a luminance/chrominance divider 110. The Y, Cr and Cb data is stored in a memory 130 in a conversion sequence, where a memory address line is connected to the output of a raster scan address generator 140. At this time, a horizontal synchronizing signal controls the change from one raster line to the next raster line, and a vertical synchronizing signal indicates the ending of a field or a frame. When an image data compressor 120 performs the DCT with respect to the data stored in the memory 130, the data stored in the memory is read in a sequence of 8×8 blocks (or 4×4 blocks), where the memory address line is connected to the output of a block scan address generator 150.

Figure 2:
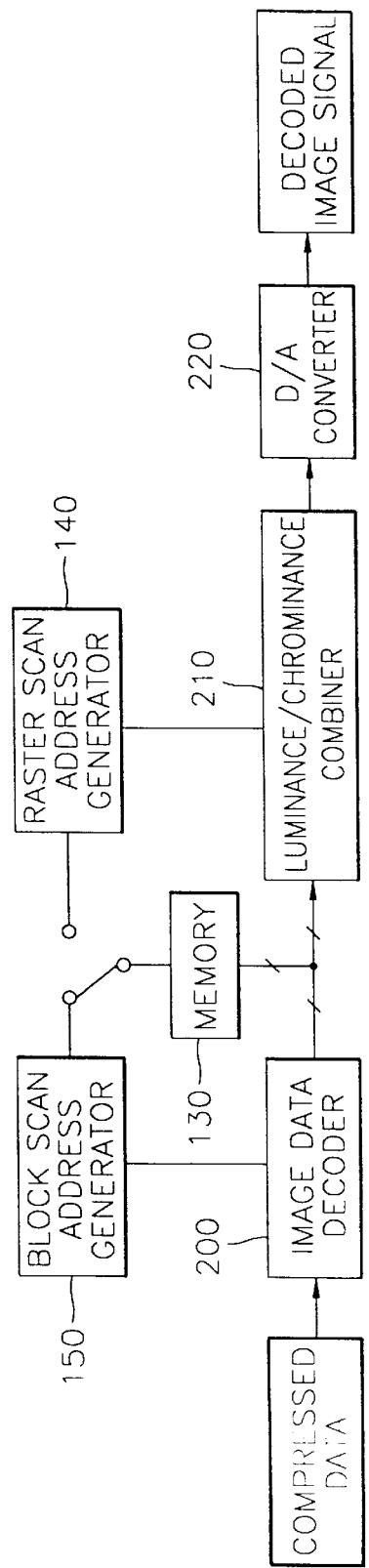
FIG. 2 is a block diagram of a conventional image decoder.

FIG. 2 is block diagram of an exemplary image data decoder. The sequence of a decoding process is the reverse of that of the compressing process. That is, memory address lines are connected to the output of a block scan address generator 150 for an image data decoder 200 to decode the compressed data, and the memory address lines are connected to the output of a raster scan address generator 140 for a luminance/chrominance combiner 210 to combine luminance and chrominance data into composite data. The combined data is decoded to an image signal by a D/A converter 220.

Figure 5A:
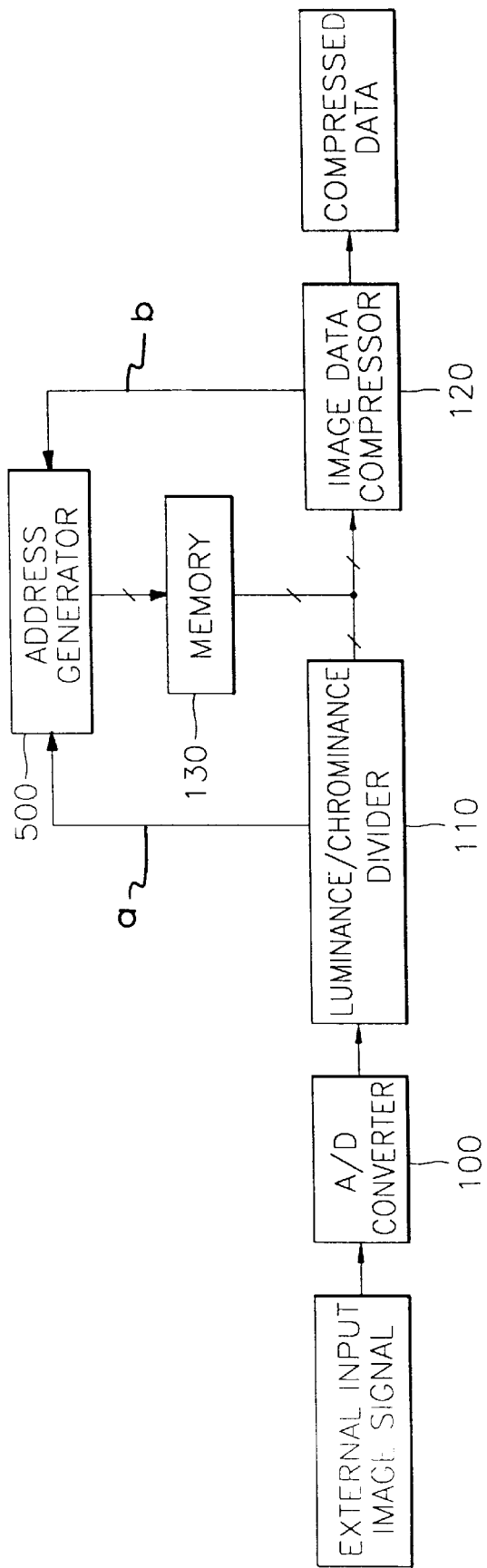
FIG. 5A is a block diagram of an image compressor including an address generator according to the present invention.

In FIG. 5A, external image signals are converted to composite data by A/D converter 100. The composite data is divided into luminance and chrominance components, and then converted to Y, Cr and Cb data in luminance/chrominance divider 110. The Y, Cr and Cb data is stored in memory 130 in a conversion sequence, where a memory address line is connected to the output of an address generator 500. The data stored in the memory is read from memory 130, where the memory address line is connected to the output of address generator 500, and image data compressor 120 performs the DCT with respect to the data stored in the memory 130. The JPEG image compressor according to the present invention includes one address generator 500 for generating raster scan addresses and a block scan addresses, described in further detail below.

Figure 5B:
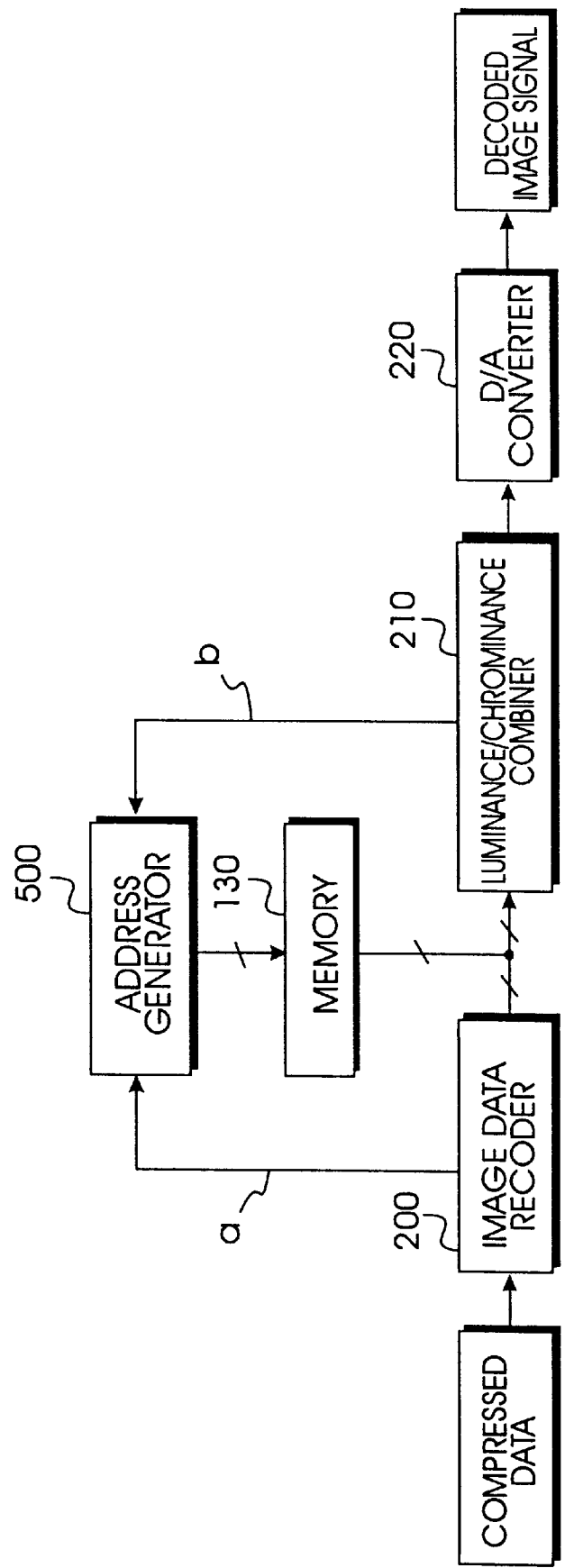
FIG. 5B is a block diagram of a decoder including an address generator according to the present invention.

An image data decoder for reconstructing compressed image data is shown in FIG. 5B, wherein the sequence of a decoding process is the reverse of that of the compressing process. That is, memory address lines are connected to the output of address generator 500 for image data decoder 200 to decode the compressed data, and for luminance/chrominance combiner 210 to combine luminance and chrominance data into composite data. The combined data is decoded to an image signal by a D/A converter 220.

Figure 6:
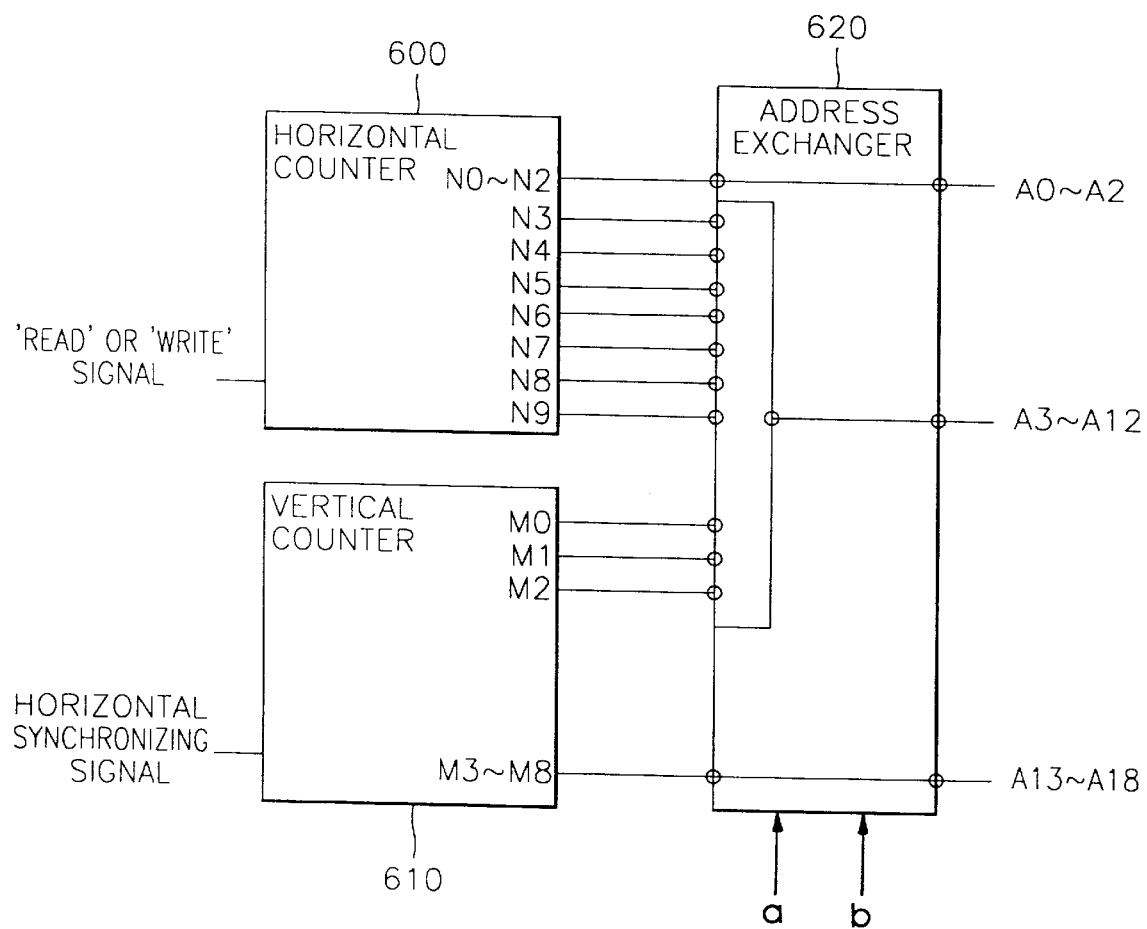
FIG. 6 is a block diagram of an address generator according to an embodiment of the present invention.

Referring to FIG. 6, address generator 500 includes a horizontal counter 600, a vertical counter 610 and an address exchanger 620. Horizontal counter 600 counts a horizontal position of an image and vertical counter 610 counts a vertical position of the image. Address exchanger 620 exchanges between memory address connections necessary for a raster scan method, required by luminance/chrominance divider 110 or the luminance/chrominance combiner 210, and memory address connections necessary for a DCT block scan method, required by the image data compressor 120 or the image data decoder 200.

The raster scan process and the block scan process will be described as follows. If the size of an image is horizontally 32 pixels and vertically 24 pixels, an input analog video signal is A/D converted to digital image data, and the converted data is stored in a memory, in a conversion sequence, as shown in FIG. 3. The first image data of a raster line 0 is stored in a memory address 0, the second data thereof in a memory address 1, the third data thereof in a memory address 2 and in the same way the thirty-second data thereof in a memory address 31. Then, the first data of a raster line 1 is stored in a memory address 32, and other data thereof are sequentially stored in 32×24 memory regions in like manner.

In general, during compression of the image data, the image data in a raster scan sequence stored in the memory is output to DCT units of an 8×8 block or a 4×4 block, to increase correlation of the image data and thus the compression efficiency. Therefore, the image data stored in the memory should be scanned in a block sequence.

Figure 4:
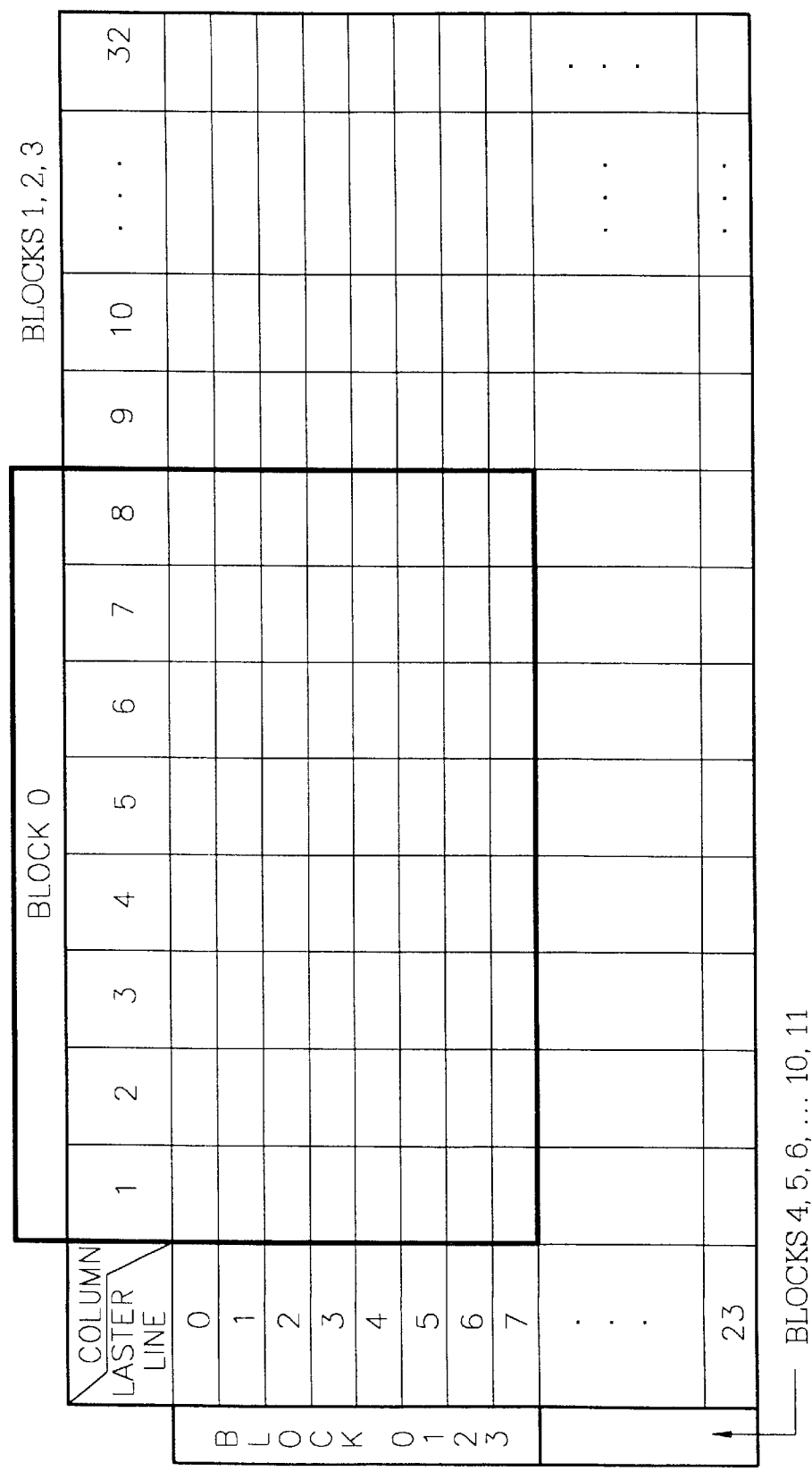
FIG. 4 shows a method of forming DCT blocks from the image data stored by the method of FIG. 3.

As shown in FIG. 4, the image data in the raster scan sequence stored in the memory will be scanned by the 8×8 block as follows. A first block is composed of,
raster line 0: 0, 1, 2, 3, 4, 5, 6, 7
raster line 1: 32, 33, 34, 35, 36, 37, 38, 39
raster line 2: 64, 65, 66, 67, 68, 69, 70, 71
raster line 3: 96, 97, 98, 99, 100, 101, 102, 103
raster line 4: 128, 129, 130, 131, 132, 133, 134, 135
raster line 5: 160, 161, 162, 163, 164, 165, 166, 167
raster line 6: 192, 193, 194, 195, 196, 197, 198, 199
raster line 7: 224, 225, 226, 227, 228, 229, 230, 231.
A second block is composed of,
raster line 0: 8, 9, 10, 11, 12, 13, 14, 15
raster line 1: 40, 41, 42, 43, 44, 45, 46, 47
raster line 2: 72, 73, 74, 75, 76, 77, 78, 79
raster line 3: 104, 105, 106, 107, 108, 109, 110, 111
raster line 4: 136, 137, 138, 139, 140, 141, 142, 143
raster line 5: 168, 169, 170, 171, 172, 173, 174, 175
raster line 6: 200, 201, 202, 203, 204, 205, 206, 207
raster line 7: 232, 233, 234, 235, 236, 237, 238, 239.
Third to eleventh blocks are composed in the same manner as above.

When the horizontal resolution of the image is 'H', horizontal counter 600 includes N output lines, where 'N' is the smallest integer satisfying $H \leq 2^N$. Horizontal counter 600 outputs to the output lines a count value sequentially incremented by a write signal for storing image data in memory 130 or a read signal for reading image data from memory 130. When the value stored in horizontal counter 600 becomes 'H' or a horizontal synchronizing signal included in the image data is detected, the value is reset to 0.

When the vertical resolution of the image is V, vertical counter 610 includes M output lines, where 'M' is the smallest integer satisfying $V \pm 2^M$. Vertical counter 610 outputs to the output lines a count value sequentially incremented by the horizontal synchronizing signal. When the value stored in vertical counter 610 becomes 'V' or a vertical synchronizing signal included in the image data is detected, the value is reset to 0.

When a signal "a" requiring raster scan is generated by luminance/chrominance divider 110 or luminance/chrominance combiner 210, address exchanger 620 connects the output lines of horizontal counter 600 to the lower memory address lines, and the output lines of vertical counter 610 to the upper memory address lines. Meanwhile, when a signal "b" requiring DCT block scan is generated by image data compressor 120 or image data decoder 200, address exchanger 620 respectively connects K lower output lines of the horizontal counter 600, (2×K+1)th to highest output lines of horizontal counter 600, K lower output lines of vertical counter 610, (K+1)th to (2×K)th output lines of horizontal counter 600, and (K+1)th to highest output lines of the vertical counter 610, to the memory address lines in the above order. Here if the size of the DCT block is B×B, $B=2^K$. In address exchanger 620, it is most desirable that the size of the DCT block is 8×8 and K is 3, or the size of the DCT block is 4×4 and K is 2.

Hereinafter, the operation of the embodiment of the present invention will be described. If the size of an image to be compressed is horizontally 640 pixels, and vertically 480 lines, then the smallest integers which satisfy $640 \leq 2^N$ and $480 \leq 2^M$ are N=10 and M=9. Thus the total number of required address lines is 19, obtained by N+M. An analog image signal is A/D-converted, the converted composite data is divided into luminance and chrominance components, and then the divided data is converted to Y, Cr and Cb data. The converted data Y, Cr and Cb is stored in the memory in a raster scan sequence. Accordingly, address generator 500 generates addresses for the raster scan sequence and outputs the addresses to the memory address lines, as shown in FIG. 7. In the raster scan method, address lines A0 to A9 of the address generator 500 are connected to outputs N0 to N9 of horizontal counter 600, and address lines A10 to A18 of address generator 500 are connected to outputs M0 to M8 of vertical counter 610.

As described above, when 640×480 image data is stored in the memory by the raster scan method, the data is read in a block scan sequence and the read data is compressed in blocks, i.e., DCT-transformed, quantized and Huffman-coded. The data is read in the block scan sequence by operating the horizontal and vertical counters in the address generator in a same manner as for the raster scan sequence, but the connections of the memory address lines A3 to A12 is changed such as the portion of FIG. 7 indicated by a thick line. That is, outputs N3, N4 and N5 of the horizontal counter are connected to the memory address lines A10, A11 and A12, and outputs N6, N7, N8 and N9 of the horizontal counter and M0, M1 and M2 of the vertical counter are respectively connected to the memory address lines A3 to A9. The horizontal and vertical synchronizing signals for reading data in the block scan sequence can be used as signals generated during a JPEG compression process, or alternatively the horizontal and vertical counters should count 0 to 639, and 0 to 479, respectively. The process of decoding the compressed data is the reverse of the compressing process.

According to the memory addressing apparatus and method of the present invention, memory address generating functions for raster scan and block scan are integrated into one unit, thereby the amount of required hardware is reduced, and simple design and structure of the apparatus reduce manufacturing cost.

What is claimed is:

1. An apparatus for generating a memory address for storing image data in a memory or for reading the image data stored in the memory in an apparatus for processing image data of which the horizontal resolution is H and the vertical resolution is V, the memory addressing apparatus comprising:

a horizontal counter including N bit outputs, where 'N' is the smallest integer satisfying $H \leq 2^N$, which outputs a horizontal count value sequentially incremented by a write or read signal for respectively storing image data in or reading image data from the memory;

a vertical counter including M bit outputs, where M is the smallest integer satisfying $V \leq 2^M$, which outputs a vertical count value sequentially incremented by a horizontal synchronizing signal included in the image data; and an address exchanger for generating an address by the horizontal count value and the vertical count value for raster scan or block scan according to a control signal.

2. The memory addressing apparatus according to claim 1, wherein the image processing apparatus is an apparatus for compressing an image data.

3. The memory addressing apparatus according to claim 1, wherein the image processing apparatus is an apparatus for reconstructing a compressed image data.

4. The memory addressing apparatus according to claim 1, wherein the horizontal counter is reset to 0 when the horizontal count value is H, and the vertical counter is reset to 0 when the vertical count value is V.

5. The memory addressing apparatus according to claim 1, wherein the horizontal counter is reset to 0 by the horizontal synchronizing signal, and the vertical counter is reset to 0 by a vertical synchronizing signal included in the image data.

6. The memory addressing apparatus according to claim 1, wherein the address exchanger generates a memory address comprising N lower address bits consisting of the horizontal count value input from the horizontal counter and M upper address bits consisting of the vertical count value input from the vertical counter when the control signal is a signal for requiring raster scan, and generates a memory address comprising a sequence of K lower bits of the horizontal count value, (2×K+1)th to Nth bits of the horizontal count value, K lower bits of the vertical count value, (K+1)th to (2×K)th bits of the horizontal count value, and (K+1)th to Mth bits of the vertical count value when the control signal is a signal for requiring block scan, where K is the integer satisfing $B=2^k$, when the block size is B×B.

7. The memory addressing apparatus according claim 6, wherein B is equal to 8.

8. The memory addressing apparatus according to claim 6, wherein B is equal to 4.

9. A method for generating a memory address for storing image data in a memory or for reading the image data stored in the memory in an apparatus for processing image data in which a horizontal resolution is H and a vertical resolution is V, the memory addressing method comprising:

a first step of generating a N bit horizontal count value, where 'N' is the smallest integer satisfying $H \leq 2^N$, sequentially incremented by a write or read signal for storing or reading image data in or from the memory;

a second step of generating a M bit vertical count value, where M is the smallest integer satisfying $V \leq 2^M$, sequentially incremented by a horizontal synchronizing signal which is included in the image data; and a third step of combining the horizontal count value and the vertical count value, thereby generating a memory address for raster scan or block scan according to a control signal.

10. The memory addressing method according to claim 9, wherein the first step comprises substeps of:

sequentially incrementing the horizontal count value by a write signal for writing data in the memory or a read signal for reading the data from the memory, and resetting the horizontal count value to 0 when the horizontal count value is H, and the second step comprises substeps of:

sequentially incrementing the vertical count value by the horizontal synchronizing signal, and resetting the vertical count value to 0 when the vertical count value is V.

11. The memory addressing method according to claim 9, wherein the first step comprises substeps of:

sequentially incrementing the horizontal count value by a write signal for writing data in the memory or a read signal for reading the data from the memory, and resetting the horizontal count value to 0 by the horizontal synchronizing signal, and the second step comprises substeps of:

sequentially incrementing the vertical count value by the horizontal synchronizing signal, and resetting the vertical count value to 0 by a vertical synchronizing signal included in the image data.

12. The memory addressing method according to claim 9, wherein the third step comprises substeps of:

generating a (M+N) bit memory address, where a lower memory address consists of the N bit horizontal count value and a upper memory address consists of the M bit vertical counting value when the control signal is a signal requiring raster scan, and generating a memory address which consists of a sequence of K lower bits of the horizontal count value, (2×K+1)th to Nth bits of the horizontal count value, K lower bits of the vertical count value, (K+1)th to (2×K)th bits of the horizontal count value, and (K+1)th to Mth bits of the vertical count value when the control signal is a signal requiring block scan, where K is the integer satisfying $B=2^k$, when the block size is B×B.

* * * * *